UNITED STATES PATENT OFFICE.

HANS P. LARSEN, OF PORTLAND, OREGON.

COMPOSITION OF MATTER FOR SOLDERING.

No. 800,807.  Specification of Letters Patent.  Patented Oct. 3, 1905.

Application filed April 3, 1905. Serial No. 253,724.

*To all whom it may concern:*

Be it known that I, HANS P. LARSEN, a citizen of the United States, residing at Portland, county of Multnomah, State of Oregon, have invented a new and useful Composition of Matter to be Used for Soldering Aluminium, of which the following is a specification.

The object of my invention is to provide an improved flux for soldering aluminium and having special qualities for that special purpose.

My composition consists of the following ingredients combined in the proportions set out, to wit: lard-oil, one pint; rosin, four ounces; chlorid of ammonia, two ounces.

The rosin and chlorid of ammonia should be first reduced to powder and then mixed with the lard-oil thoroughly to prepare my composition.

In using the above-described flux for soldering aluminium it should only be used with a proper and suitable aluminium solder, and to secure the best results I prefer for a solder one composed of sixty-five per cent. Banca tin and thirty-five per cent. of zinc prepared by melting the same together. The soldering-iron and surfaces to be soldered should be made perfectly clean. The flux is then applied in a lukewarm condition by a brush to the parts to be soldered and the aluminium solder next applied by means of a heated soldering-iron and the parts firmly soldered together in a manner well known to those skilled in the art.

My composition possesses the properties of a practical and never-failing flux for the purpose herein indicated, and thus has advantages which peculiarly distinguish it from all other compositions proposed for similar purposes, for by its use an aluminium joint can be quickly, firmly, and effectually soldered, and at the same time the aluminium is not stained, corroded, or deprived of its natural color or appearance.

I claim—

1. The above-described composition of matter, consisting of lard-oil, rosin and chlorid of ammonia, substantially as described and for the purpose specified.

2. The composition of matter set forth for preparing aluminium surfaces for soldering and for fluxing an aluminium solder, consisting of lard-oil one pint, rosin four ounces, chlorid of ammonia two ounces, substantially as described.

In testimony whereof I have signed my name to this specification in the presence of two subscribing witnesses.

H. P. LARSEN.

Witnesses:
 E. S. HORN,
 W. S. HUFFORD.